(12) United States Patent
Craig

(10) Patent No.: US 8,145,402 B2
(45) Date of Patent: Mar. 27, 2012

(54) GPS-BASED TRACTION CONTROL SYSTEM AND METHOD USING DATA TRANSMITTED BETWEEN VEHICLES

(75) Inventor: William C. Craig, Endicott, NY (US)

(73) Assignee: Lockheed Martin Corporation, Grand Prairie, TX (US)

( * ) Notice: Subject to any disclaimer, the term of this patent is extended or adjusted under 35 U.S.C. 154(b) by 0 days.

(21) Appl. No.: 11/987,862

(22) Filed: Dec. 5, 2007

(65) Prior Publication Data

US 2009/0150036 A1    Jun. 11, 2009

(51) Int. Cl.
G06F 7/00 (2006.01)
(52) U.S. Cl. .......................................................... 701/80
(58) Field of Classification Search .................. 701/36, 701/45, 70–75, 80–82, 93, 117–119, 200, 701/208, 213, 300–302; 340/901, 903, 905, 340/995.26–995.28; 180/271
See application file for complete search history.

(56) References Cited

U.S. PATENT DOCUMENTS

| | | | |
|---|---|---|---|
| 4,072,850 A | 2/1978 | McGlynn | |
| 4,593,357 A | 6/1986 | Van Ostrand et al. | |
| 4,621,833 A | 11/1986 | Soltis | |
| 4,691,284 A | 9/1987 | Izumi et al. | |
| 4,843,557 A | 6/1989 | Ina et al. | |
| 4,882,693 A | 11/1989 | Yopp | |
| 4,922,427 A | 5/1990 | Yokote et al. | |
| 4,954,957 A | 9/1990 | Kawagoe et al. | |
| 5,037,119 A | 8/1991 | Takehara et al. | |
| 5,044,660 A | 9/1991 | Yamamura et al. | |
| 5,091,856 A | 2/1992 | Hasegawa et al. | |
| 5,123,497 A | 6/1992 | Yopp et al. | |
| 5,136,513 A | 8/1992 | Sol et al. | |
| 5,161,106 A | 11/1992 | Shiraishi et al. | |
| 5,183,127 A | 2/1993 | Kageyama et al. | |
| 5,255,193 A | 10/1993 | Katayose et al. | |
| 5,265,693 A | 11/1993 | Rees et al. | |
| 5,265,945 A | 11/1993 | Yamashita et al. | |

(Continued)

FOREIGN PATENT DOCUMENTS

CA    2370580    5/2003

(Continued)

OTHER PUBLICATIONS

Proceedings of the IEEE, vol. 88, No. 7, Jul. 2000, "Automotive Engine Control and Hybrid Systems: Challenges and Opportunities", pp. 888-912.

(Continued)

*Primary Examiner* — Kim T Nguyen
(74) *Attorney, Agent, or Firm* — Slater & Matsil, L.L.P.

(57) ABSTRACT

System and method for controlling vehicle operating characteristics. The method includes receiving, at a vehicle, global positioning system (GPS) data, and, based on the received GPS data, determining the vehicle's location. The method also receives data from another vehicle. The method then modifies one or more vehicle operating characteristics based on the determined location and on data received from another vehicle, the characteristics including a suspension dampening characteristic, a spring rate characteristic, ABS braking characteristics, stability control system characteristics, a seat shock absorber characteristic, etc.

20 Claims, 12 Drawing Sheets

U.S. PATENT DOCUMENTS

| | | | |
|---|---|---|---|
| 5,281,008 A | 1/1994 | Kawamura et al. | |
| 5,366,041 A | 11/1994 | Shiraishi | |
| 5,369,584 A | 11/1994 | Kajiwara | |
| 5,400,265 A | 3/1995 | Kauppinen | |
| 5,401,052 A | 3/1995 | Yoshioka et al. | |
| 5,408,411 A | 4/1995 | Nakamura et al. | |
| 5,469,356 A | 11/1995 | Hawkins et al. | |
| 5,487,002 A | 1/1996 | Diller et al. | |
| 5,513,107 A | 4/1996 | Gormley | |
| 5,564,796 A | 10/1996 | Saito et al. | |
| 5,632,503 A | 5/1997 | Raad et al. | |
| 5,636,909 A | 6/1997 | Hirao et al. | |
| 5,713,425 A | 2/1998 | Buschhaus et al. | |
| 5,906,560 A | 5/1999 | Minowa et al. | |
| 5,906,645 A | 5/1999 | Kagawa et al. | |
| 5,941,919 A | 8/1999 | Pastor et al. | |
| 5,971,089 A | 10/1999 | Sawada | |
| 6,018,308 A | 1/2000 | Shirai | |
| 6,038,500 A | 3/2000 | Weiss | |
| 6,074,020 A | 6/2000 | Takahashi et al. | |
| 6,092,014 A | 7/2000 | Okada | |
| 6,097,316 A | 8/2000 | Liaw et al. | |
| 6,098,005 A | 8/2000 | Tsukamoto et al. | |
| 6,122,572 A | 9/2000 | Yavnai | |
| 6,151,537 A | 11/2000 | Gheordunescu et al. | |
| 6,151,549 A | 11/2000 | Andrews et al. | |
| 6,154,688 A | 11/2000 | Dominke et al. | |
| 6,155,365 A | 12/2000 | Boberg | |
| 6,182,000 B1 | 1/2001 | Ohta et al. | |
| 6,188,945 B1 | 2/2001 | Graf et al. | |
| 6,199,001 B1 | 3/2001 | Ohta et al. | |
| 6,199,003 B1 | 3/2001 | Hollingsworth et al. | |
| 6,216,068 B1 | 4/2001 | Gimmler et al. | |
| 6,226,581 B1 | 5/2001 | Reimann et al. | |
| 6,240,347 B1 | 5/2001 | Everhart et al. | |
| 6,249,727 B1 | 6/2001 | Muller | |
| 6,260,859 B1 | 7/2001 | Dixon | |
| 6,278,929 B1 | 8/2001 | Tozu et al. | |
| 6,381,524 B1 | 4/2002 | Kuragaki et al. | |
| 6,421,593 B1 | 7/2002 | Kempen et al. | |
| 6,424,900 B2 | 7/2002 | Murray et al. | |
| 6,438,482 B1 | 8/2002 | Baumann et al. | |
| 6,681,180 B2 | 1/2004 | Bevly et al. | |
| 6,704,622 B2 | 3/2004 | Tinskey et al. | |
| 6,738,701 B2 | 5/2004 | Wilson | |
| 6,816,764 B2 | 11/2004 | Coelingh et al. | |
| 6,856,877 B2 | 2/2005 | Coelingh et al. | |
| 6,873,891 B2 | 3/2005 | Moser et al. | |
| 6,879,898 B2 | 4/2005 | Ghoneim et al. | |
| 6,904,351 B1 | 6/2005 | Hac | |
| 6,982,635 B2* | 1/2006 | Obradovich | 340/439 |
| 7,016,778 B1 | 3/2006 | Ehmer et al. | |
| 7,083,025 B2 | 8/2006 | Bedner et al. | |
| 7,092,808 B2 | 8/2006 | Lu et al. | |
| 7,162,333 B2 | 1/2007 | Koibuchi et al. | |
| 7,162,343 B2 | 1/2007 | Subbian et al. | |
| 7,162,346 B2 | 1/2007 | Berry et al. | |
| 7,266,437 B2 | 9/2007 | Hrovat et al. | |
| 7,276,014 B2 | 10/2007 | Goto et al. | |
| 7,302,333 B2 | 11/2007 | Steen et al. | |
| 7,337,053 B2 | 2/2008 | Piyabongkarn et al. | |
| 7,341,541 B2 | 3/2008 | Houtman et al. | |
| 7,349,776 B2 | 3/2008 | Spillane et al. | |
| 7,366,602 B2 | 4/2008 | Xu et al. | |
| 7,373,227 B2 | 5/2008 | Lu et al. | |
| 7,392,120 B2 | 6/2008 | Matsumoto et al. | |
| 7,426,437 B2* | 9/2008 | Breed et al. | 701/301 |
| 7,444,222 B2 | 10/2008 | Villella et al. | |
| 7,451,033 B2 | 11/2008 | Xu et al. | |
| 2001/0003805 A1 | 6/2001 | Koibuchi | |
| 2002/0016659 A1 | 2/2002 | Tashiro et al. | |
| 2002/0099484 A1 | 7/2002 | Kuragaki et al. | |
| 2002/0116101 A1 | 8/2002 | Hashiba et al. | |
| 2003/0120395 A1 | 6/2003 | Kacel | |
| 2003/0171865 A1 | 9/2003 | Moser et al. | |
| 2003/0182026 A1 | 9/2003 | Awada et al. | |
| 2003/0191568 A1 | 10/2003 | Breed | |
| 2003/0195666 A1 | 10/2003 | Mactavish et al. | |
| 2003/0200016 A1 | 10/2003 | Spillane et al. | |
| 2003/0225494 A1 | 12/2003 | Coelingh et al. | |
| 2003/0225495 A1 | 12/2003 | Coelingh et al. | |
| 2003/0225496 A1 | 12/2003 | Coelingh et al. | |
| 2004/0044443 A1 | 3/2004 | Eriksson | |
| 2004/0044448 A1 | 3/2004 | Ramaswamy et al. | |
| 2004/0193352 A1 | 9/2004 | Ito et al. | |
| 2004/0193363 A1 | 9/2004 | Schmidt et al. | |
| 2004/0249533 A1 | 12/2004 | Wheals et al. | |
| 2004/0267427 A1 | 12/2004 | Suzuki et al. | |
| 2005/0004732 A1 | 1/2005 | Berry et al. | |
| 2005/0043872 A1 | 2/2005 | Heyn | |
| 2005/0080528 A1 | 4/2005 | Obradovich | |
| 2005/0080546 A1 | 4/2005 | Milot | |
| 2005/0096799 A1 | 5/2005 | Boswell et al. | |
| 2005/0114007 A1 | 5/2005 | Pillar et al. | |
| 2005/0149243 A1 | 7/2005 | Ghoneim | |
| 2005/0165886 A1 | 7/2005 | Tuer et al. | |
| 2005/0177287 A1 | 8/2005 | Wang et al. | |
| 2005/0203684 A1 | 9/2005 | Borgesson | |
| 2005/0206234 A1 | 9/2005 | Tseng et al. | |
| 2005/0209742 A1 | 9/2005 | Sakakibara et al. | |
| 2006/0015231 A1 | 1/2006 | Yoshimura et al. | |
| 2006/0041360 A1 | 2/2006 | Post, II | |
| 2006/0074530 A1 | 4/2006 | Meyers et al. | |
| 2006/0076828 A1 | 4/2006 | Lu et al. | |
| 2006/0100062 A1 | 5/2006 | Goto et al. | |
| 2006/0214506 A1* | 9/2006 | Albright et al. | 303/123 |
| 2007/0032913 A1* | 2/2007 | Ghoneim et al. | 701/1 |
| 2007/0050112 A1 | 3/2007 | Kroehnert et al. | |
| 2007/0067085 A1 | 3/2007 | Lu et al. | |
| 2007/0118263 A1 | 5/2007 | Nelson | |
| 2007/0184929 A1 | 8/2007 | Piyabongkarn et al. | |
| 2007/0244620 A1 | 10/2007 | Drenth | |
| 2007/0265758 A1 | 11/2007 | Miura | |
| 2007/0294016 A1 | 12/2007 | Braun et al. | |
| 2008/0040005 A1 | 2/2008 | Breed | |
| 2008/0082234 A1 | 4/2008 | Majersik et al. | |
| 2008/0183353 A1 | 7/2008 | Post et al. | |
| 2008/0215223 A1 | 9/2008 | Yamada et al. | |
| 2008/0243335 A1 | 10/2008 | Rao et al. | |
| 2008/0243336 A1 | 10/2008 | Fitzgibbons | |
| 2009/0143936 A1 | 6/2009 | Craig | |
| 2009/0143937 A1 | 6/2009 | Craig | |
| 2009/0150036 A1 | 6/2009 | Craig | |
| 2010/0211248 A1 | 8/2010 | Craig et al. | |
| 2010/0211277 A1 | 8/2010 | Craig et al. | |
| 2010/0211278 A1 | 8/2010 | Craig et al. | |

FOREIGN PATENT DOCUMENTS

| | | |
|---|---|---|
| DE | 4416991 A1 | 11/1995 |
| DE | 19904216 A1 | 1/2000 |
| DE | 10209884 | 3/2003 |
| EP | 0563845 A1 | 6/1993 |
| EP | 0832770 A2 | 4/1998 |
| EP | 0 922 618 A2 | 6/1999 |
| EP | 0 978 435 A2 | 2/2000 |
| EP | 1028011 A2 | 8/2000 |
| EP | 1 355 209 A1 | 10/2003 |
| EP | 1574368 A1 | 9/2005 |
| FR | 2796 893 | 2/2001 |
| GB | 2357159 A | 6/2001 |
| JP | 4103436 | 4/1992 |
| JP | 04238745 | 8/1992 |
| JP | 06219187 | 8/1994 |
| JP | 06219191 | 8/1994 |
| JP | 2004080066 A | 3/2004 |
| WO | WO 95/31638 | 11/1995 |
| WO | WO 01/54940 A1 | 8/2001 |
| WO | WO 03/044609 | 5/2003 |
| WO | WO 03/067844 | 8/2003 |
| WO | WO 2004106102 A1 | 12/2004 |

OTHER PUBLICATIONS

Integrated Manufacturing Systems, vol. 5 No. 4/5, 1994, pp. 5-12 "An Exploration of Concepts in System Integration".

Industrial Robot, vol. 4, No. 5, 1997, pp. 364-369, "Automating Agricultural Vehicles".

Electronics Times, Mar. 26, 2001, "ECUs Used to Win Control".

"Overlay Wiring Architecture and EDS Challenges in Hybrid Electric Vehicle Prototypes", Ford Motor Company, Dr. Arun K. Jaura et al., pp. 1-12.

JSAE Review 22 (2001), pp. 453-461, "Coordinated Control of a Mechanical Hybrid Driveline with a Continuously Variable Transmission", Shiwen Shen et al.

International Search Report and Written Opinion of the International Searching Authority dated May 29, 2008, International Application No. PCT/US 07/11203 filed May 9, 2007.

Supplementary European Search Report dated Jan. 22, 2010, European Application No. 07867109.6.

\* cited by examiner

GPS-BASED TRACTION CONTROL SYSTEM AND METHOD USING DATA TRANSMITTED BETWEEN VEHICLES

The present invention relates generally to vehicle control, and, more specifically, to systems and methods for controlling vehicle operating characteristics using Global Positioning System (GPS) data.

DETAILED DESCRIPTION

Figure 1:
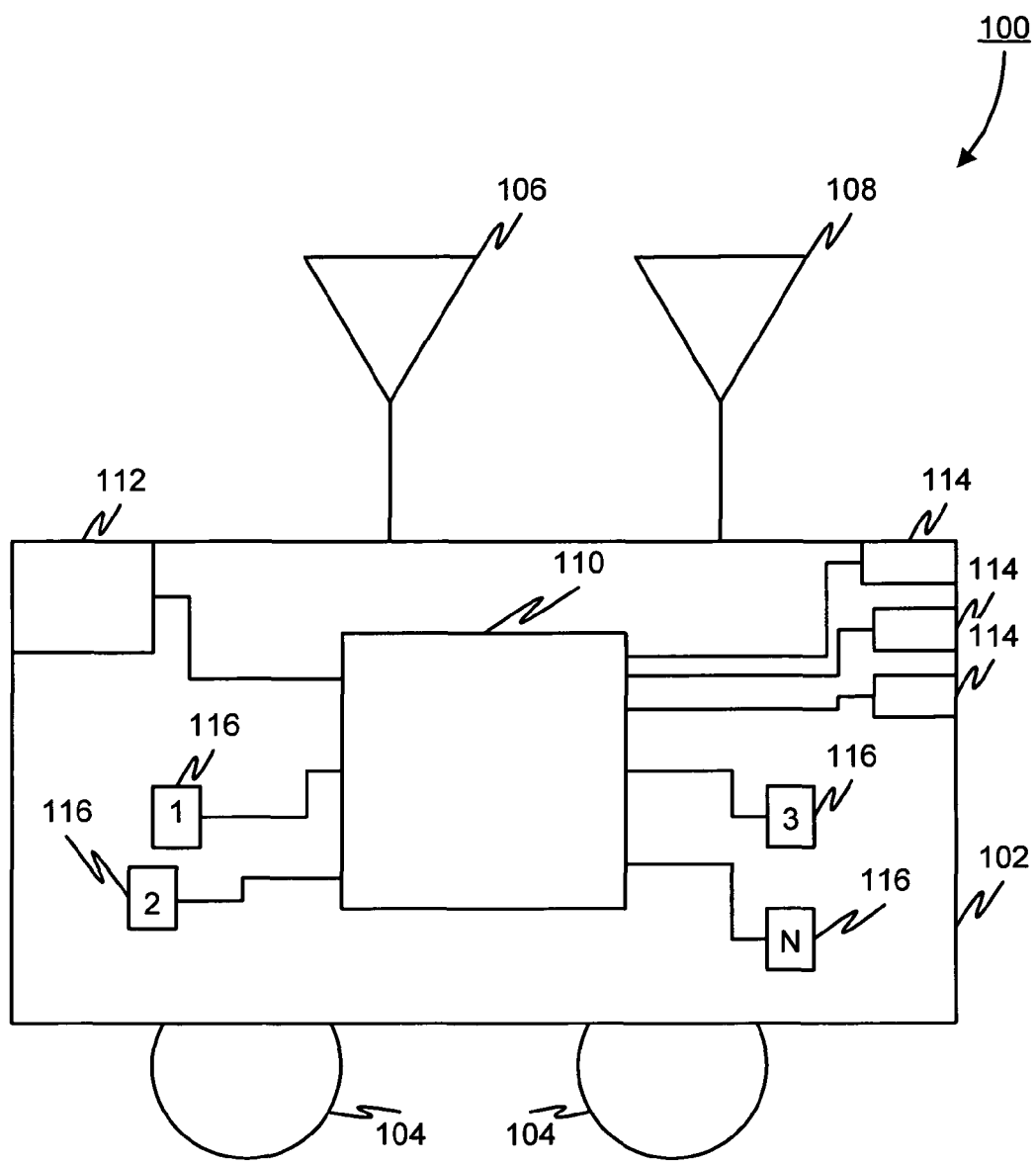
FIG. 1 is a system level block diagram according to various embodiments.

Embodiments are directed generally to a system and method for controlling operating characteristics of a vehicle. In particular, various embodiments can comprise a system and method for controlling vehicle operating characteristics comprising a global positioning system (GPS) receiver that receives, at the vehicle, GPS data; a controller coupled to the GPS receiver and a terrain map data storage unit that locally stores terrain map information, where the controller is configured to determine a location of said vehicle based on received GPS data, identify terrain map information associated with the determined location, determine a terrain based on the identified terrain map information, and output at least one signal to modify, based on the determined terrain, one or more vehicle operating characteristics. The modifying can take place automatically and/or in real time. In various embodiments, the location of the vehicle can be an unpaved and/or off-road location, such as on unpaved ground. Various embodiments can also comprise a system and method for controlling operating characteristics of one or more vehicles based on transmitted data, wherein the transmitted data can include a determined terrain and weather information. In various embodiments, operating characteristics of one vehicle can be controlled based on received data or information transmitted from another vehicle. The operating characteristics can be controlled automatically and/or in real time based on the received data or information from the another vehicle.

Received data or information can include, for example, a determined terrain and/or weather information associated with and transmitted from the another vehicle. In various embodiments, in response to the determined terrain and/or the weather information, a first command can be formulated at the another vehicle effective to modify operating characteristics of the another vehicle, and a second command can be formulated at the another vehicle effective to modify operating characteristics of the one vehicle. In various embodiments, the transmitted data to the one vehicle can consist of the second command. Optionally or alternatively, the received data at the one vehicle can comprise a command from the another vehicle effective to modify at least one operating characteristic of the one vehicle. In various embodiments, the command can be based on the determined terrain and/or the retrieved weather information associated with a determined unpaved and off-road location of the another vehicle.

Optionally or alternatively, data transmitted to the one vehicle can be data representing a condition of ground over which the another vehicle passes. In various embodiments, the ground can be unpaved and/or off-road. One or more operating characteristics of the one vehicle can be adjusted or modified based on the received data. In various embodiments, the characteristics can be adjusted or modified automatically and/or in real time. Furthermore, in various embodiments, the ground condition can be a surface condition of the ground. Optionally, the surface condition of the ground can be sensed by a sensor on the another vehicle. Optionally or alternatively, the data representing a ground condition can indicate a level of slipperiness of the ground under the another vehicle.

FIG. 1 shows a block diagram of a system 100 according to various embodiments. System 100 may be configured in any suitable mobile vehicle, including, but not limited to, wheeled vehicles, tracked vehicles, runner vehicles, hydroplanes, or the like. Motive power for vehicle 102 can be provided by any suitable means, including, but not limited to, a combustion engine, an electric motor, a hybrid motor, etc. Vehicle 102 can be manned or unmanned and may be configured to traverse any suitable terrain, including, but not limited to "on road" surfaces, "off-road" surfaces (e.g., non-paved, severe grade, severe slide slope, altitude, snow, ice, etc.), water, etc.

In various embodiments, system 100 can include a traversing system 104, a GPS unit 106, a weather information system 108, a controller 110, a control panel 112, one or more sensors 114, and a plurality of vehicle subsystems 116. As shown in FIG. 1, controller 110 can be coupled to GPS unit 106, weather information system 108, control panel 112, one or more sensors 114, and the plurality of vehicle subsystems 116.

In various embodiments, traversing system 104 may be any suitable system for effecting movement for vehicle 102. For example, traversing system 104 can be, but is not limited to, a wheeled system, a track system, a runner system, a hydroplane system, or the like. Moreover, vehicle 102 may include more than one traversing system or combinations of traversing systems 104. As shown in FIG. 1, for example, vehicle 102 employs a wheel-based traversing system 104, which may implement any suitable number of wheels, such as four wheels or six wheels, without limitation.

Figure 2:
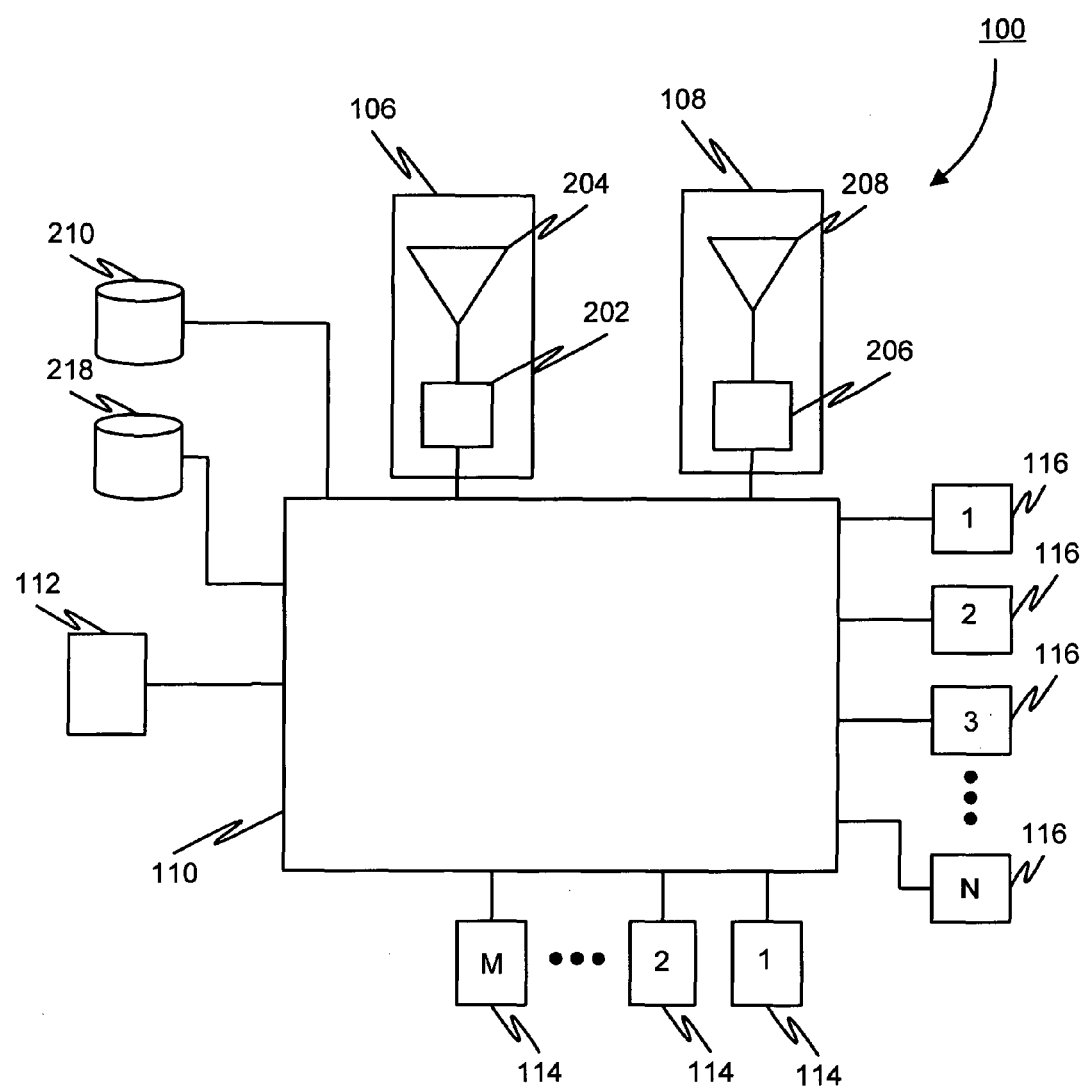
FIG. 2 is a schematic block diagram of a system according to various embodiments.

GPS unit 106 can be coupled to vehicle 102 and/or controller 110. For example, GPS unit 106 can be mechanically coupled to vehicle 102 by any suitable means and can be communicably coupled to controller 110. As shown in FIG. 2, in various embodiments, GPS unit 106 may include a GPS antenna 204 and a GPS receiver 202. GPS antenna 204 may be coupled to GPS receiver 202, and GPS receiver 202 may be coupled to controller 110. GPS antenna 204 can be any suitable antenna known in the art. Likewise, GPS receiver 202 may be any suitable receiver or transceiver capable of receiving GPS data. In various embodiments, GPS antenna 204 can receive GPS data sent from any suitable source, including, but not limited to, one or both of a terrestrial source or extraterrestrial source, such as a satellite or orbital source. GPS data may correspond to one or more of the vehicle's 102 location, longitude, latitude, speed, velocity, direction, attitude, and altitude. GPS data can also represent a time component. GPS antenna 204 can send the GPS data to GPS receiver 202, which, in turn, can send the GPS data to controller 110. Conversely, controller 110 can send GPS data to GPS receiver 202, which can send the GPS data to GPS antenna 204 for transmission to a location remote from vehicle 102. In various embodiments, GPS data can be transmitted from vehicle 102 to another vehicle or vehicles.

Referring back to FIG. 1, weather information system 108 can be coupled to vehicle 102 and controller 110. For example, weather information system 108 may be mechanically coupled to vehicle 102 by any suitable means and can be communicably coupled to controller 110.

Turning again to FIG. 2, in various embodiments, weather information system 108 can include a weather information antenna 208 and a weather information receiver 206. Weather information antenna 208 may be coupled to weather information receiver 206, which may be coupled to controller 110. In various embodiments, weather information system 108 can receive weather information from any suitable source, including, but not limited to, terrestrial sources and extraterrestrial sources, such as a satellite or an orbital source. Weather information can be representative of one or more weather conditions, such as, for example, prevailing weather conditions associated with a predetermined region, prevailing weather conditions associated with the vehicle's location, and prevailing weather conditions based on previous or historical weather conditions. In various embodiments, weather information received by weather information antenna 208 can be sent to controller 110 via weather information receiver 206. In at least one embodiment, weather information can be sent from controller 110 to be transmitted by weather antenna 208 via weather receiver 206 (now technically a transceiver) to a location remote from vehicle 102. In various embodiments, weather information can be transmitted from vehicle 102 to another vehicle or vehicles. In various embodiments, the weather information can be transmitted wirelessly.

System 100 can also include one or more sensors 114, which may be configured at any suitable position about vehicle 102. In various embodiments, and as seen in FIG. 2, system 100 can have, for example, M number of sensors 114, where M is an integer and is greater than or equal to one. In addition, sensors 114 can be coupled to controller 110 and can be configured to receive at least one weather input. In various embodiments, weather inputs received by sensors 114 can represent locally-sensed weather characteristics. Locally-sensed weather characteristics can include current weather characteristics, such as local weather characteristics including, but are not limited to, temperature, precipitation, humidity, air pressure, wind speed, etc. Each sensor 114 can send a signal indicative of the locally-sensed weather input to controller 110. Controller 110 can also send signals representative of the locally-sensed weather input to weather information system 108, where the signals may be transmitted to a location remote from vehicle 102, such as another vehicle. Transmitted signals may include data representative of a determined terrain and weather information. Furthermore, transmitted signals may be transmitted from a first vehicle to one or more other vehicles to adjust respective one or more operating characteristics of the one or more other vehicles. In various embodiments, the adjusting can take place automatically and/or in real time at the one or more other vehicles.

Control panel 112 can be coupled to controller 110. Control panel 112 may be configured to receive operator inputs by any suitable manner known in the art. In various embodiments, inputs may be entered manually by a user using, for example, a liquid crystal touch screen, pushbuttons, dials, switches, knobs, etc. Inputs may also be entered remotely by a signal transmitted from a location remote vehicle 102. Control panel 112 can also include a display (not shown), which may display any appropriate information and/or data. Control panel 112's display may take the form of any suitable display, including, but not limited to, a liquid crystal display, light emitting diodes, etc. Control panel 112 can be used to enter any suitable inputs, including, but not limited to information, data, and/or commands. In various embodiments, control panel 112 can transmit signals representative of the inputs to controller 110, which can be used to modify vehicle subsystems and/or to control various parameters associated with system 100 and vehicle 102.

Vehicle subsystems 116 can be configured at any suitable position about vehicle 102 and can be coupled to controller 110, and there can be any suitable number of vehicle subsystems 116. As shown in FIG. 2, for example, there can be N number of subsystems, where N is an integer greater than or equal to one. Vehicle subsystems 116 may include any suitable vehicle subsystems, such as, but not limited to, a suspension system, a suspension damping system, a braking system, a tire pressure system, a central tire inflation system, a drive train system, a stability control system, a torque management system, a ride height adjustment system, a transmission system, a seat shock absorber system, a traction control system, and the like. In various embodiments, each vehicle subsystem 116 can receive signals from controller 110 to modify various aspects of the vehicle subsystem 116, including, but not limited to, modifying vehicle subsystem 116 parameters, operating characteristics, performance characteristics, etc. Vehicle's 102 operating parameters may include a suspension dampening characteristic, a spring rate characteristic, ABS braking characteristics, stability control system characteristics, a seat shock absorber characteristic, etc.

As indicated above, one or more of the operating characteristics of vehicle 102, for example relating to one or more of the systems provided above, may be adjusted or modified based on one or more of terrain information associated with a position of vehicle 102, weather information associated with the position of the vehicle 102, or a user-selected operation mode of the vehicle, for instance selected using control panel 112. Moreover, one or more of the operating characteristics of one or more additional vehicles, for example relating to one or more of the systems provided above, may be adjusted or modified based on receipt by the one or more additional vehicles of one or more of terrain information associated with a position of vehicle 102, weather information associated with the position of the vehicle 102, and/or a user-selected operation mode of each particular additional vehicle, for instance selected using control panel 112 from each additional vehicle.

As seen in FIG. 2, controller 110 can also be coupled to a terrain map data storage unit 210 and a weather information storage unit 218. In various embodiments, controller 110 can send and receive GPS data and/or terrain data to and from GPS unit 106; can send and receive weather data, weather input signals, and terrain data to and from weather information system 108; can receive signals from vehicle sensors 114; can send and receive signals to and from control panel 112; can send and receive data to and from terrain map data storage unit 210; can send and receive data to and from weather information storage unit 218; and can send and receive signals to and from each of vehicle subsystems 116.

Controller 110 can include a computer readable medium encoded with programmed instructions which, when executed by a processor of the controller 110, for example, can cause at least the following operations: receiving, at vehicle 102, global positioning system (GPS) data; determining a location of the vehicle 102 based on the received GPS data; identifying terrain map information associated with the determined location of the vehicle 102; and determining a terrain based on the identified terrain map information. In various embodiments, the terrain can include surface characteristics or a surface condition at the determined location. In various embodiments, a sensor on the vehicle 102 can sense the surface characteristic or a surface condition at the determined location. Furthermore, in various embodiments, the controller 110 can cause transmission from the vehicle 102 to a second vehicle, the determined surface characteristics and weather information associated with the determined location of the vehicle 102. Controller 110 also can cause retrieval of weather information associated with the determined location of the vehicle 102 and transmission of the retrieved weather information to the second vehicle. In various embodiments, retrieval of the weather information can include sensing of weather conditions with sensors on the first vehicle.

Controller 110 can be any suitable controller including, but not limited to a computer, a microcomputer, a microcontroller, or a processor (e.g., MC 68000 series microprocessor available from Motorola, Inc. of Schaumburg, Ill.), or the like. In addition, controller 110 may operate in response to instructions recorded on a readable medium and executed by controller 110. Such instructions may be written in any suitable programming language, including, but not limited to, C, C++, Java™, Visual Basic, or any object-oriented programming language.

In various embodiments, system 100 may also include terrain map data storage unit 210. As shown in FIG. 2, terrain map data storage unit 210 may be coupled to controller 110. Terrain map data storage unit 210 may be any suitable storage apparatus, including, but not limited to hard disk drive, removable disk drive, ROM, RAM, EEPROM, PROM, flash memory, etc. Moreover, although the terrain map data storage unit 210 is shown in FIG. 2 as a single unit, terrain map data storage unit 210 may be comprised of a plurality of distinct or separate individual units. In various embodiments, terrain map data storage unit 210 can store terrain information relating to various locations. Terrain map information can comprise terrain data related to features and/or characteristics of land or topography, such as surface features and/or characteristics. Moreover, terrain data can also comprise a particular geographic area or region. In various embodiments, terrain information relating to various locations may relate to GPS data, such as, but not limited to, a location determined based on GPS data. Terrain map data storage unit 110 can be preloaded with terrain information and GPS data, or can be loaded, as needed, using control panel 112 or by any suitable means including, but not limited to, a means located remote from the vehicle 102. Moreover, terrain information may be related to GPS data by any suitable means, including, but not limited to a look-up table, etc.

System 100 can also include weather information storage unit 218. In various embodiments, weather information storage unit 218 may be coupled to controller 110. Weather information storage unit 218 may be any suitable storage apparatus, including, but not limited to hard disk drive, removable disk drive, ROM, RAM, EEPROM, PROM, flash memory, etc. Moreover, although the weather information storage unit 218 is shown in FIG. 2 as a single unit, weather information storage unit 218 may be comprised of a plurality of distinct or separate individual units.

In various embodiments, weather information storage unit 218 can store weather information designated as current weather information. In addition, weather information that is received by either weather information system 108 or sensors 114 can be stored in weather information storage unit 218 as current weather information. Controller 110 can send current weather information received by either weather information system 108 or sensors 114 to weather information storage unit 218. In various embodiments, weather information storage unit 218 can also send weather information to controller 110.

Weather information may also include historical weather information. Historical weather information can be preloaded into weather information storage unit 218 or can be loaded, as needed, using control panel 112 or any appropriate means, including, but not limited to, a means located remote from vehicle 102. In addition, historical weather information can be received by weather information system 108. Historical weather information may also refer to weather information that is not the most recently updated current weather information. Historical weather information can indicate, for example, whether it has been raining or snowing for several hours or days. This may, depending on the terrain, indicate a change in the terrain's conditions, whereas a brief shower may indicate a different change in the terrain's conditions. Historical weather information may also indicate, for example, temperature trends which can be used to predict when slippery road conditions are likely to occur or become worse.

Referring now to FIGS. 3-10, a method that modifies one or more vehicle operating characteristics according to various embodiments will now be described.

Figure 3:
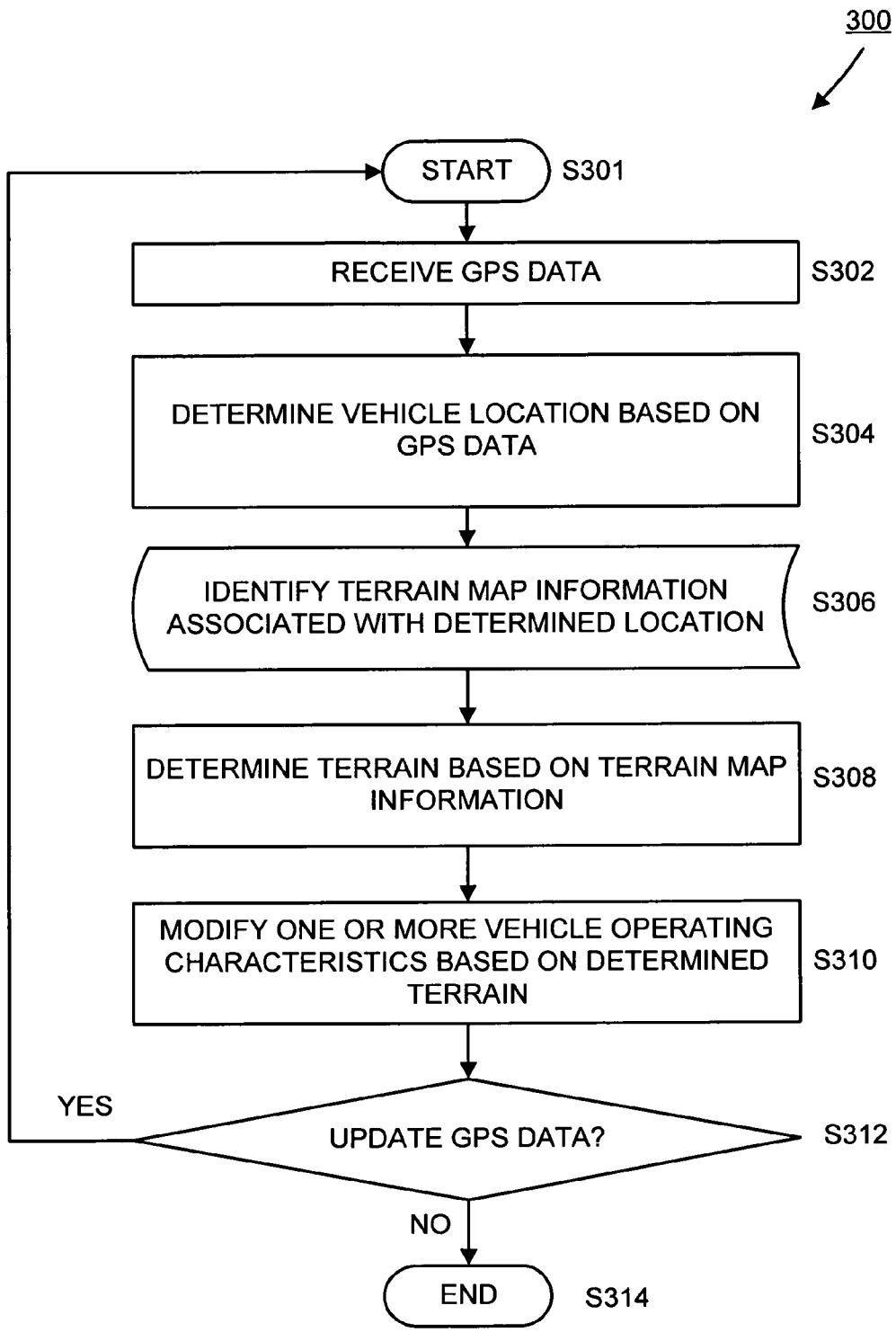
FIG. 3 is a flow chart of a method for modifying one or more vehicle operating characteristics based on terrain according to various embodiments.

In at least one embodiment, as shown in FIG. 3, a method 300 can comprise modifying one or more vehicle operating characteristics based on a determined terrain. Control may begin at S301 in response to any suitable condition, such as, but not limited to, an input received at control panel 112, a command signal, a predetermined time period, etc. For example, the steps shown in FIG. 3 may be commenced every second, every minute, every hour, every two hours, every day, etc. From S301, control may proceed to S302, where system 100 receives GPS data. GPS data can be received by GPS antenna 204 and sent to controller 110 via GPS receiver 202. Control may then proceed to S304. At S304, controller 110 can process the received GPS data and determine, in any suitable manner, the vehicle's 102 location based on the GPS data. Once the vehicle's 102 location has been determined, control may proceed to S306 where controller 110 can identify terrain map information associated with the vehicle's 102 determined location. In various embodiments, controller 110 can identify terrain map information by searching terrain map data storage unit 210. Once controller 110 has identified the terrain map information, controller may retrieve the identified information and, as can be seen by S308, determine the terrain based on the terrain map information identified in terrain map data storage unit 210. Control may then proceed to S310. In S310, one or more vehicle operating characteristics can be modified based on the determined terrain. To modify one or more vehicle operating characteristics, controller 110 may send signals to one or more vehicle subsystems 116. Control may then proceed to S312 where it is determined whether system 100 requires further updating of GPS data. If yes, control can return to S301. In various embodiments, at S312, controller 110 can determine whether an update of the GPS data is needed based on, for example, an input from control panel 112, the expiration of a predetermined time period, or a predetermined distance traveled by vehicle 102. If it is determined that GPS data does not need updating, control can proceed to S314 where the process is terminated.

Figure 4:
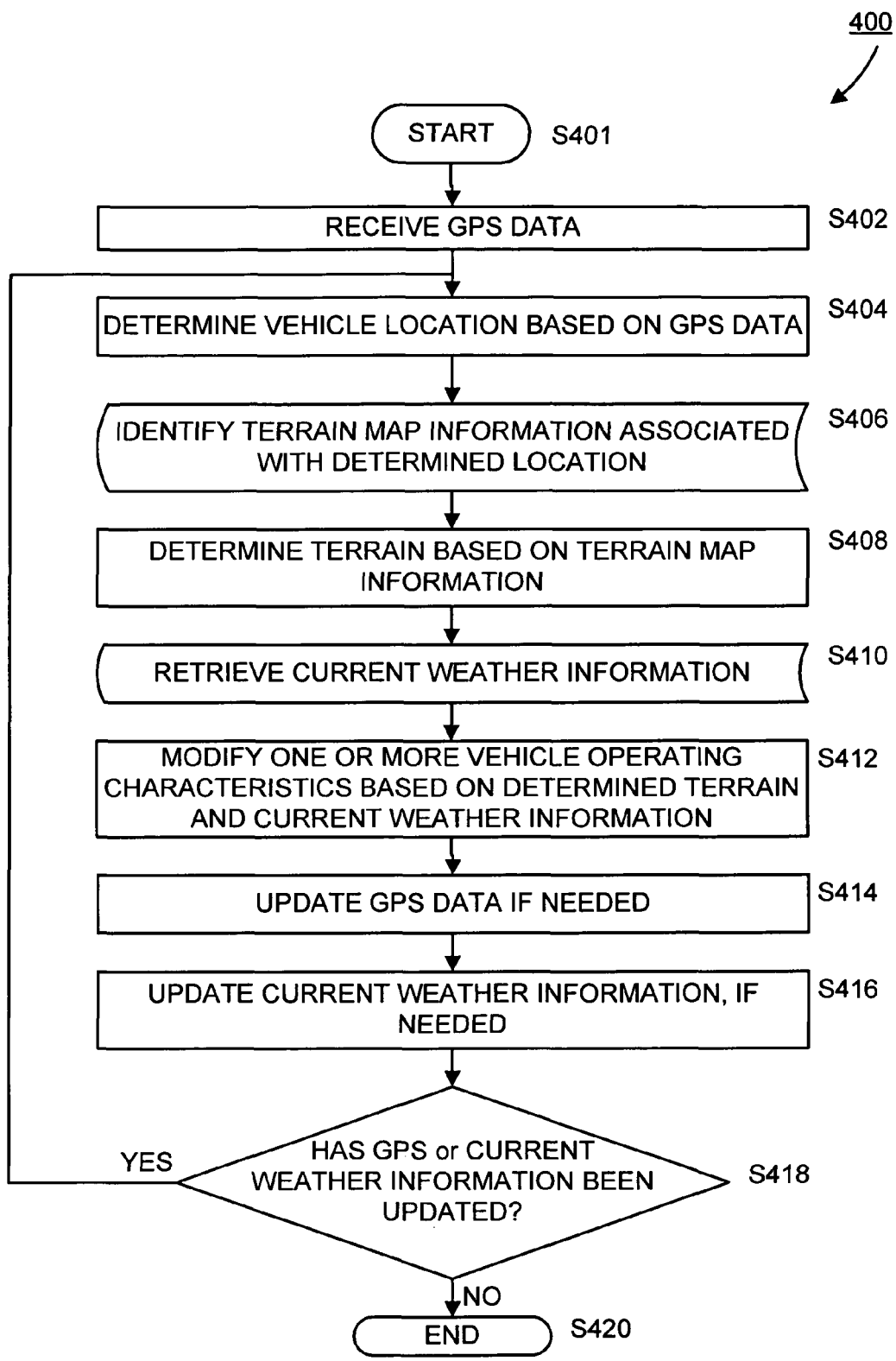
FIG. 4 is a flow chart of a method for modifying one or more vehicle operating characteristics based on terrain and current weather information according to various embodiments.

FIG. 4 is a flow chart of another embodiment of a method 400 for modifying one or more vehicle operating characteristics. In this embodiment, one or more vehicle operating characteristics can be modified based on the determined terrain and retrieved current weather information. In FIG. 4, S401-S408, and S420 may be substantially as described with respect to S302-S308, S312, and S314, respectively, of FIG. 3. As such, a discussion of these features will not be repeated. Beginning at S410, system 100 can retrieve current weather information. In various embodiments, controller 110 can retrieve current weather information from weather information storage unit 218. Weather information, which can also be sent from either a terrestrial source or an extraterrestrial source, can be also retrieved by controller 110, via weather information antenna 208 and weather information receiver 206. In addition, while shown as following S408, S410 can also be located at any point between S401 and S408. After S410, control may then proceed to S412 where one or more vehicle operating characteristics can be modified based on both the determined terrain and the current weather information. In various embodiments, controller 110 may send signals to one or more vehicle subsystems 116 to modify vehicle operating characteristics associated with respective ones of vehicle subsystems 116. Control may then proceed to S414, where controller 110 updates GPS data if it is determined that GPS data needs to be updated. In various embodiments, at S414, controller 110 can determine whether an update of the GPS data is needed based on, for example, an input from control panel 112, the expiration of a predetermined time period, or a predetermined distance traveled by vehicle 102. Control may then proceed to S416, where controller 110 updates current weather information if it is determined that current weather information needs to be updated. In various embodiments, controller 110 may determine whether current weather information needs to be updated based on, for example, an input from control panel 112, the expiration of a predetermined time period, or a predetermined distance traveled by vehicle 102. Control may then proceed to S418, where controller 110 determines whether one or both of GPS data and current weather information has been updated. If it is determined that one or both of GPS data and current weather information has been updated, control may proceed to S404, where the method determines the vehicle's location based on the updated GPS data. If it is determined that one or both of GPS data and current weather information has not been updated, control may proceed to S420 at which the method ends.

Figure 5:
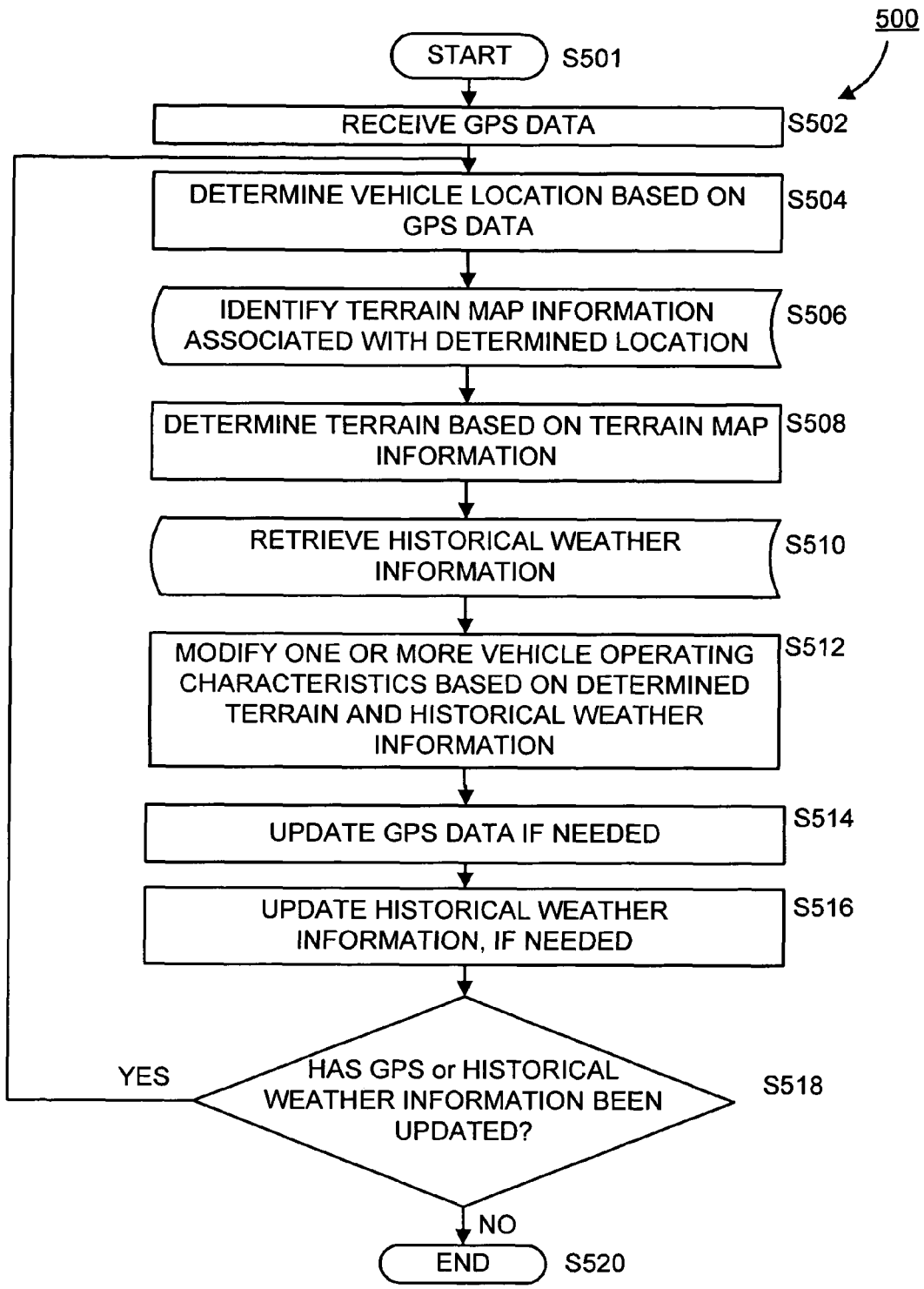
FIG. 5 is a flow chart of a method for modifying one or more vehicle operating characteristics based on terrain and historical weather information according to various embodiments.

FIG. 5 represents a block diagram of another embodiment of a method that modifies one or more vehicle operating characteristics. In this embodiment, one or more vehicle operating characteristics can be modified based on the determined terrain and historical weather information. In FIG. 5 features S501-S508, S514, and S520 may be substantially as described with respect to S301-S308, S414, and S420 from FIG. 3 and FIG. 4, respectively. As such, a discussion of these features will not be repeated. Thus, beginning with S510, system 100 can retrieve historical weather information. In various embodiments, historical weather information may be retrieved from weather information storage unit 218 by controller 110. Historical weather information, which can also be sent from either a terrestrial source or an extraterrestrial source, can also be retrieved by controller 110, via weather information antenna 208 and weather information receiver 206. In addition, while shown as following S508, S510 can also be located at any point between S501 and S508. After S510, control may then proceed to S512 where one or more vehicle operating characteristics can be modified based on both the determined terrain and the historical weather information. Controller 110 may send signals to one or more vehicle subsystems 116 to modify vehicle operating characteristics associated with respective ones of vehicle subsystems 116. Control may then proceed to S514, where controller 110 updates GPS data if it is determined that GPS data needs to be updated. In various embodiments, at S514, controller 110 can determine whether an update of the GPS data is needed based on, for example, an input from control panel 112, the expiration of a predetermined time period, or a predetermined distance traveled by vehicle 102. Control may proceed to S516, where controller 110 updates historical weather information if it is determined that historical weather information needs to be updated. In various embodiments, controller 110 may determine whether historical weather information needs to be updated based on, for example, an input from control panel 112, the expiration of a predetermined time period, or a predetermined distance traveled by vehicle 102. Control may then proceed to S518, where controller 110 determines whether one or both of GPS data and historical weather information has been updated. If it is determined that one or both of GPS data and historical weather information has been updated, control may proceed to S504, where the method determines the vehicle's location based on the updated GPS data. If it is determined that one or both of GPS data and historical weather information has not been updated, control may proceed to S520 at which the method ends.

Figure 6:
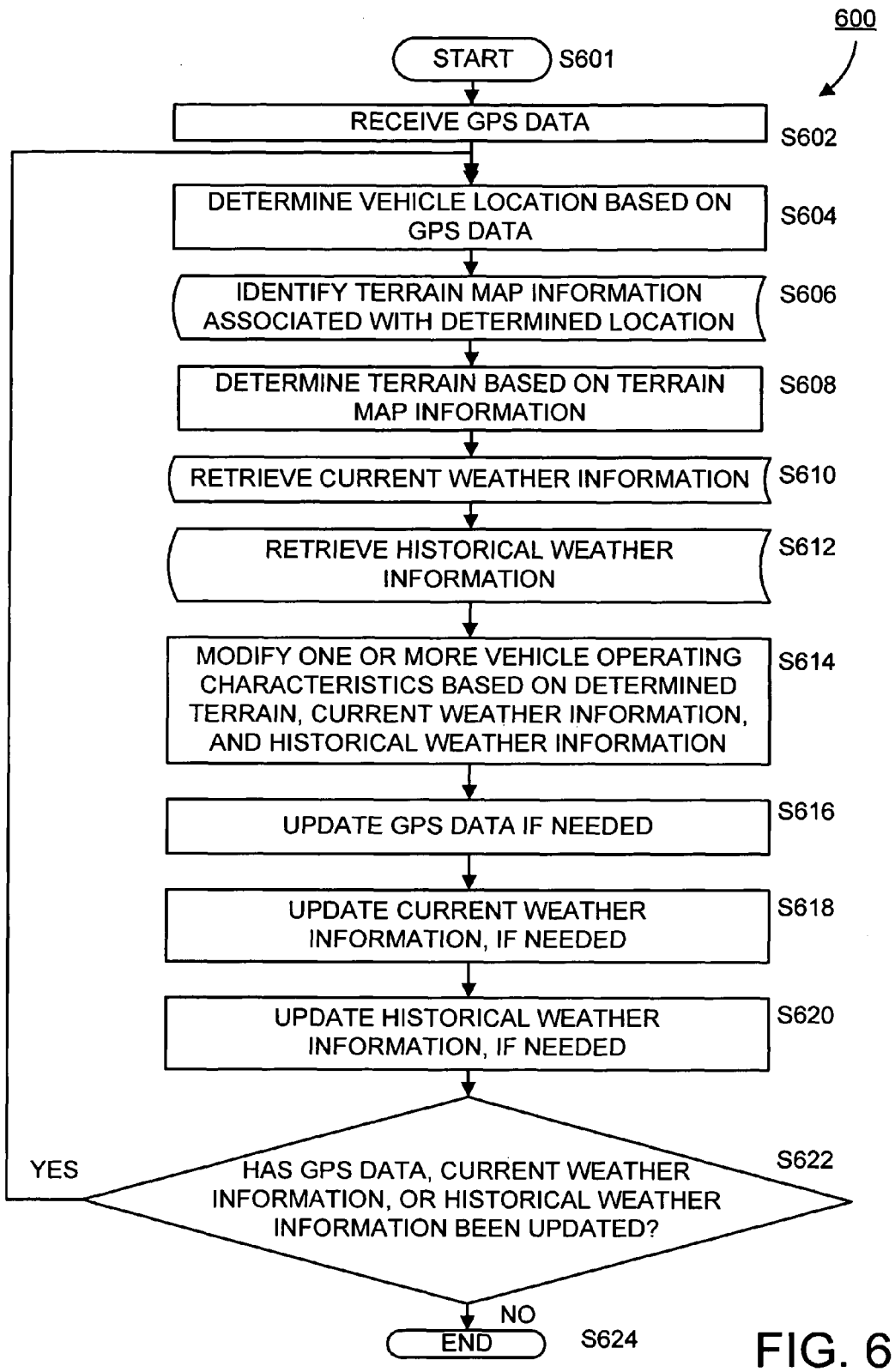
FIG. 6 is a flow chart of a method for modifying one or more vehicle operating characteristics based on terrain, current weather information, and historical weather information according to various embodiments.

FIG. 6 is a flow chart of another embodiment of a method 600 that modifies one or more vehicle operating characteristics. In this embodiment, one or more vehicle operating characteristics can be modified based on the determined terrain, current weather information, and historical weather information. In FIG. 6 features S601-S612, S616, S618, S620, and S624 may be substantially as described with respect to S301-S308, S314, S410, S414, S416, S510, and S516. As such, descriptions of these features will not be substantially repeated. In addition to the steps just listed, FIG. 6 shows control going from S612 to S614. At S614, one or more vehicle operating characteristics can be modified based on the determined terrain, current weather information, and historical weather information. In various embodiments, based on the determined terrain, current weather information, and historical weather information, controller 110 may send signals to one or more vehicle subsystems 116 to modify vehicle operating characteristics associated with respective ones of vehicle subsystems 116. Control may then proceed to S616, where, as described above, controller 110 updates GPS data, if needed, then to S618 where controller 110 updates current weather information, if needed, and then to S620 where controller 110 updates historical weather information, if needed. In various embodiments, at S616, S618, and S620, controller 110 can determine whether respective updates of the GPS data, current weather information, or historical weather information are needed based on, for example, an input from control panel 112, the expiration of a predetermined time period, or a predetermined distance traveled by vehicle 102. Control may then proceed to S622, where controller 110 determines whether one or more of GPS data, current weather information, and historical weather information has been updated. If it is determined that one or more of GPS data, current weather information, and historical weather information has been updated, control may proceed to S604, where the method determines the vehicle's location based on the updated GPS data. If it is determined that one or more of GPS data, current weather information, and historical weather information has not been updated, control may proceed to S624 at which the method ends.

Figure 7:
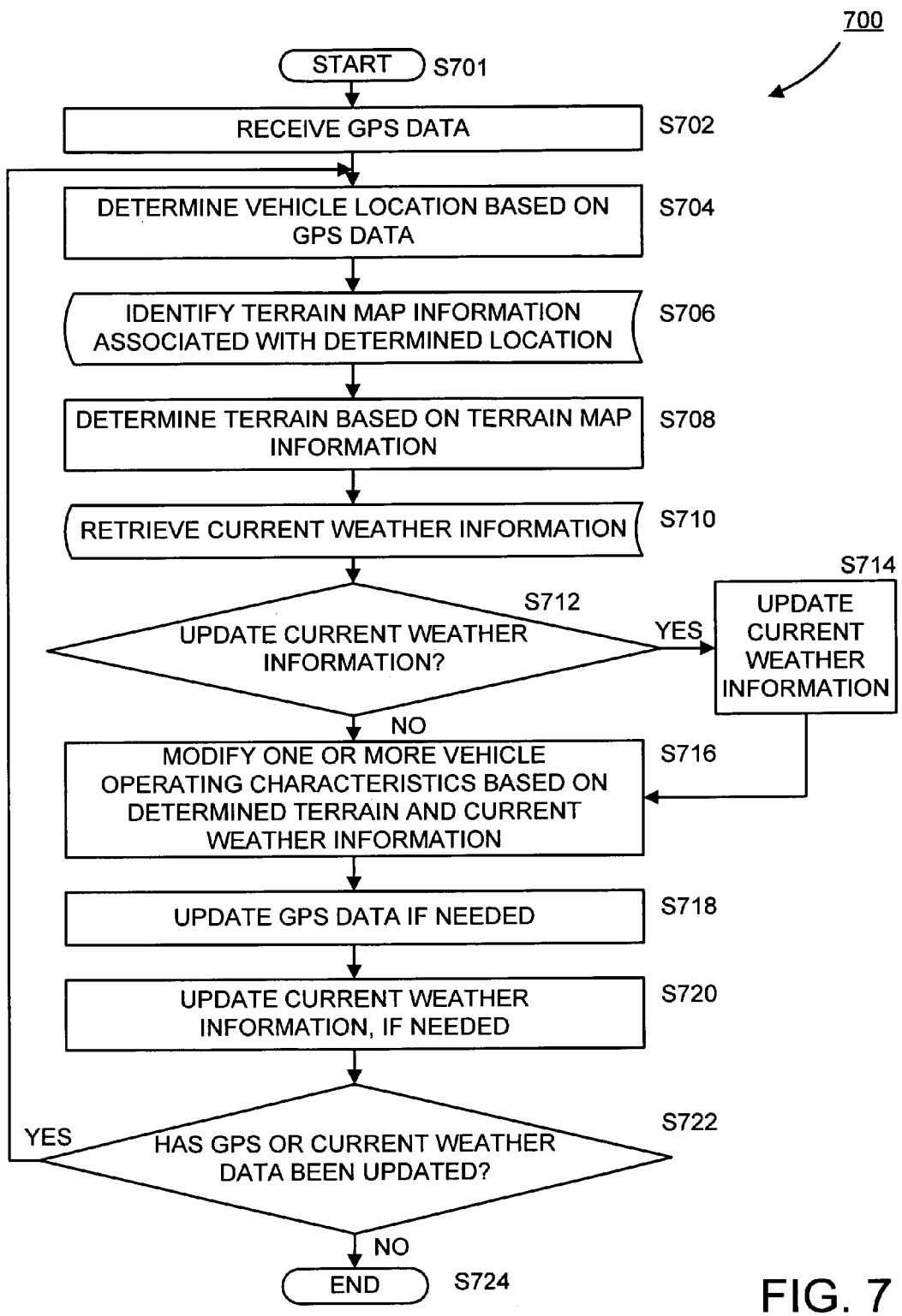
FIG. 7 is a flow chart of a method for modifying one or more vehicle operating characteristics based on terrain and current weather information according to various embodiments.

FIG. 7 is a flow chart of another embodiment of a method 700 that modifies one or more vehicle operating characteristics. In this embodiment, one or more vehicle operating characteristics can be modified based on the determined terrain and, optionally on current weather information. FIG. 7 includes several features substantially as described with respect to FIGS. 3 and 4. As such, these features will not be described again. Also shown in the embodiment exemplified by FIG. 7 is the feature that current weather information can be optionally updated before being used to modify one or more vehicle operating characteristics. Proceeding from S710, at S712 it is determined whether the retrieved current weather information is to be updated. In various embodiments, controller 110 can make the determination as to whether the retrieved current weather information is to be updated. The determination may be based on any suitable criteria, including, but not limited to, input signals received from control panel 112, input signals received from weather information system, an indication of a distance traveled, and a predetermined time period. If controller 110 determines that current weather information is not to be updated, control proceeds to S716 where one or more vehicle operating characteristics can be modified based on the determined terrain and current weather information. However, if controller 110 determines that current weather information is to be updated, control may proceed to S714. At S714, current weather information is updated before it, along with the determined terrain, is used to modify one or more vehicle operating characteristics. From S714, control may proceed to S716, to S718, S720, and then to S722, all of which are substantially as described with respect to S412, S414, S416, and S418, respectively, which were already discussed before. At S722, based on the determination, control may proceed either to S704 or to S724, at which the method ends.

Figure 8:
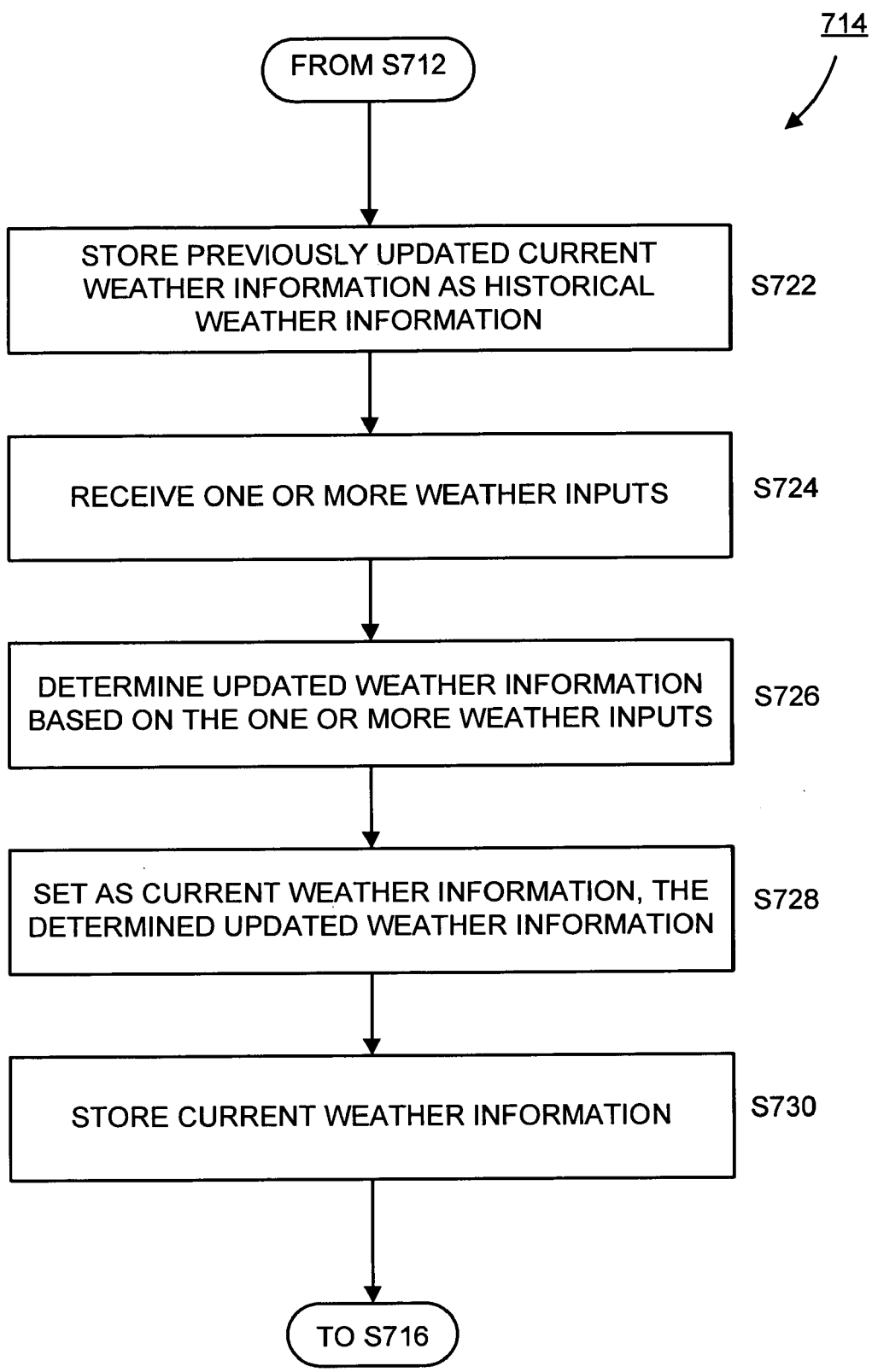
FIG. 8 is a flow chart of a method for updating current weather information according to various embodiments.

FIG. 8 illustrates the step of S714 in greater detail. At S726, previously updated current weather information, which may be stored in weather information storage unit 218, can be stored in weather information storage unit 218 as historical weather information. This may involve designating the weather information as historical weather information or relocating the weather information to another part of weather information storage unit 218 specifically provided to store historical weather information. Control may then proceed to S728, where system 100 may receive one or more weather inputs using weather information antenna 208 and weather information receiver 206 and/or sensors 114. In various embodiments, weather inputs can be received by controller 110 from both weather information receiver 206 and one or more sensors 114. Weather inputs received from information receiver 206 can indicate prevailing weather conditions and weather inputs received from sensors 114 can indicate locally-sensed weather characteristics. At S730, updated weather information can be determined based on the one or more weather inputs. Control may then proceed to S732 where controller 110 sets updated current weather information as weather information, and then stores the newly set current weather information in weather information storage unit 218 at S734. As indicated in FIG. 8, control may then proceed to S716 in FIG. 7.

Figure 9:
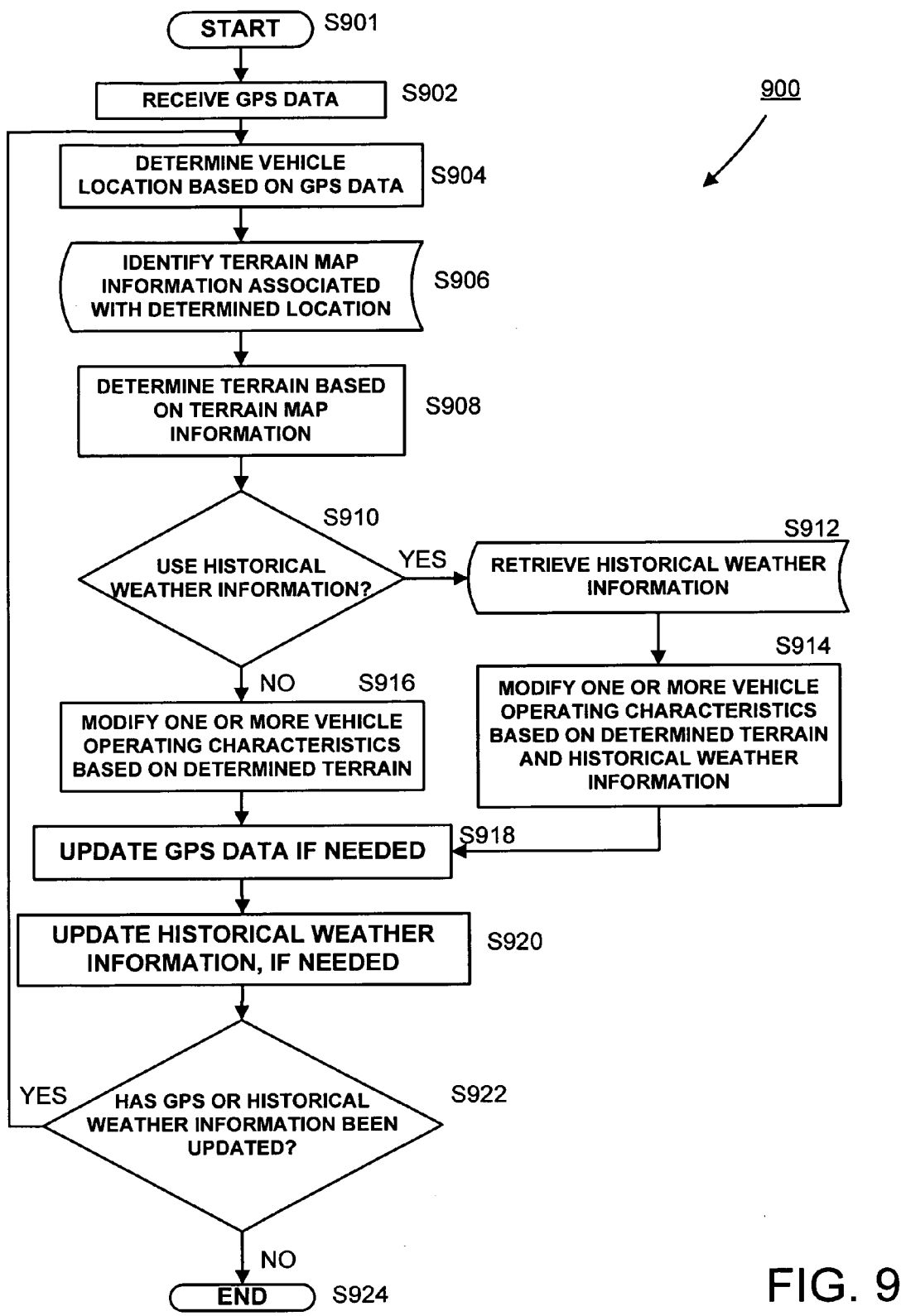
FIG. 9 is a flow chart of a method for modifying one or more vehicle operating characteristics based on either terrain or terrain and historical weather information.

FIG. 9 is a flow chart of another embodiment of a method 900 that modifies one or more vehicle operating characteristics. In this embodiment, one or more vehicle operating characteristics can be modified based on the determined terrain and, optionally, based on historical weather information. In FIG. 9 S901-S908, S912, S914, S916, S918, S920, and S922 are substantially as described with respect to S301-S308, S310,S314, S510, S512, S514, S516, and S518, and will not be substantially described again. As can be seen in FIG. 9, control can proceed from S908 to S910. At S910, controller 110 determines whether historical weather information is to be used to modify one or more vehicle operating parameters. This determination may be made in any suitable manner. If controller 110 determines that historical weather information is not to be used, control may continue to S916 where one or more vehicle operating characteristics are modified by controller 110 sending signals to corresponding vehicle subsystems 116 based on the determined terrain. If, however, controller 110 determines that historical weather information is to be used, control may proceed to S912, where historical weather information is retrieved from weather information storage unit 218. As can be seen from S914, once historical weather information has been retrieved, it, along with the determined terrain, can be used by controller 110 to send signals to vehicle subsystems 116 to modify one or more vehicle operating characteristics. Control may then proceed to S918, to S920, and then to S922, all of which are substantially as described above with respect to S514, S516, and S518, respectively. At S922, based on the determination, control may proceed either to S904 or to S924, at which the method ends.

Figure 10:
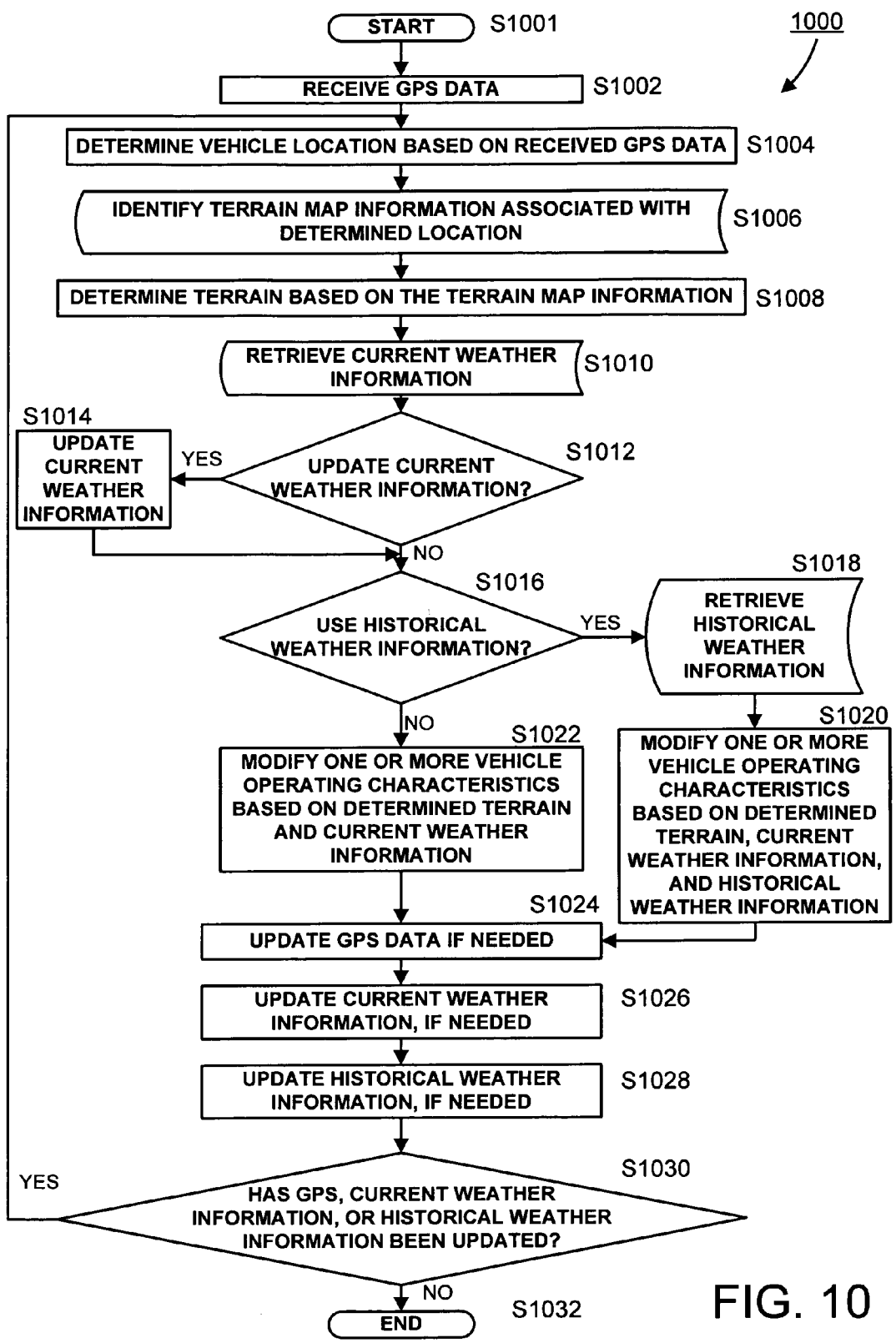
FIG. 10 is a flow chart of a method for modifying one or more vehicle operating characteristics based on either terrain and current weather information or terrain, current weather information, and historical weather information.

FIG. 10 is a flow chart of another embodiment of a method 1000 that modifies one or more vehicle operating characteristics. In this embodiment, one or more vehicle operating characteristics can be modified based on the determined terrain, current weather information, and, optionally, historical weather information. FIG. 10 also shows the optional step of updating current weather information. FIG. 10 includes features S1001 to S1008 and S1032, which may be substantially as described with respect to S300-S308 and S314, respectively. As such, these features will not be described again. Thus, beginning with S1010, controller can retrieve current weather information. S1010 can be performed substantially the same as described above with respect to S410. From S1010, control may proceed to S1012, where controller 110 determines whether current weather information is to be updated. Similar to as described previously with respect to S712, the determination may be based on any suitable criteria, including, but not limited to, input signals received from control panel 112, input signals received from weather information system 108, an indication of a distance traveled, and a predetermined time period. If controller 110 determines that current weather information is to be updated, control may proceed to S1014, where current weather information is updated in a process substantially as described with respect to FIG. 8. Control may then proceed to S1016. On the other hand, if controller 110 determines that current weather information is not to be updated, control may proceed directly to S1016. At S1016, controller 110 can determine whether or not to use historical weather information. If controller 110 determines that historical weather information is to be used, control can proceed to S1018 and S1020, where controller 110 respectively retrieves historical weather information and sends signals to modify one or more vehicle operating characteristics based on the determined terrain, current weather information, and historical weather information. From S1020, control can proceed to S1024, to S1026, to S1028, and to S1030, which are substantially as described with respect to S414, S416, S516, and S622, respectively. If, however, controller 110 determines that historical weather information is not to be used, control may go from S1016 to S1022. At S1022, controller 110 sends signals to modify one or more vehicle operating characteristics based on the determined terrain and current weather information. From S1022, control may proceed to S1024, to S1026, to S1028, and to S1030, as described above. At S1030, based on the determination, control may proceed either to S1004 or to S1032, where the method ends.

Figure 11:
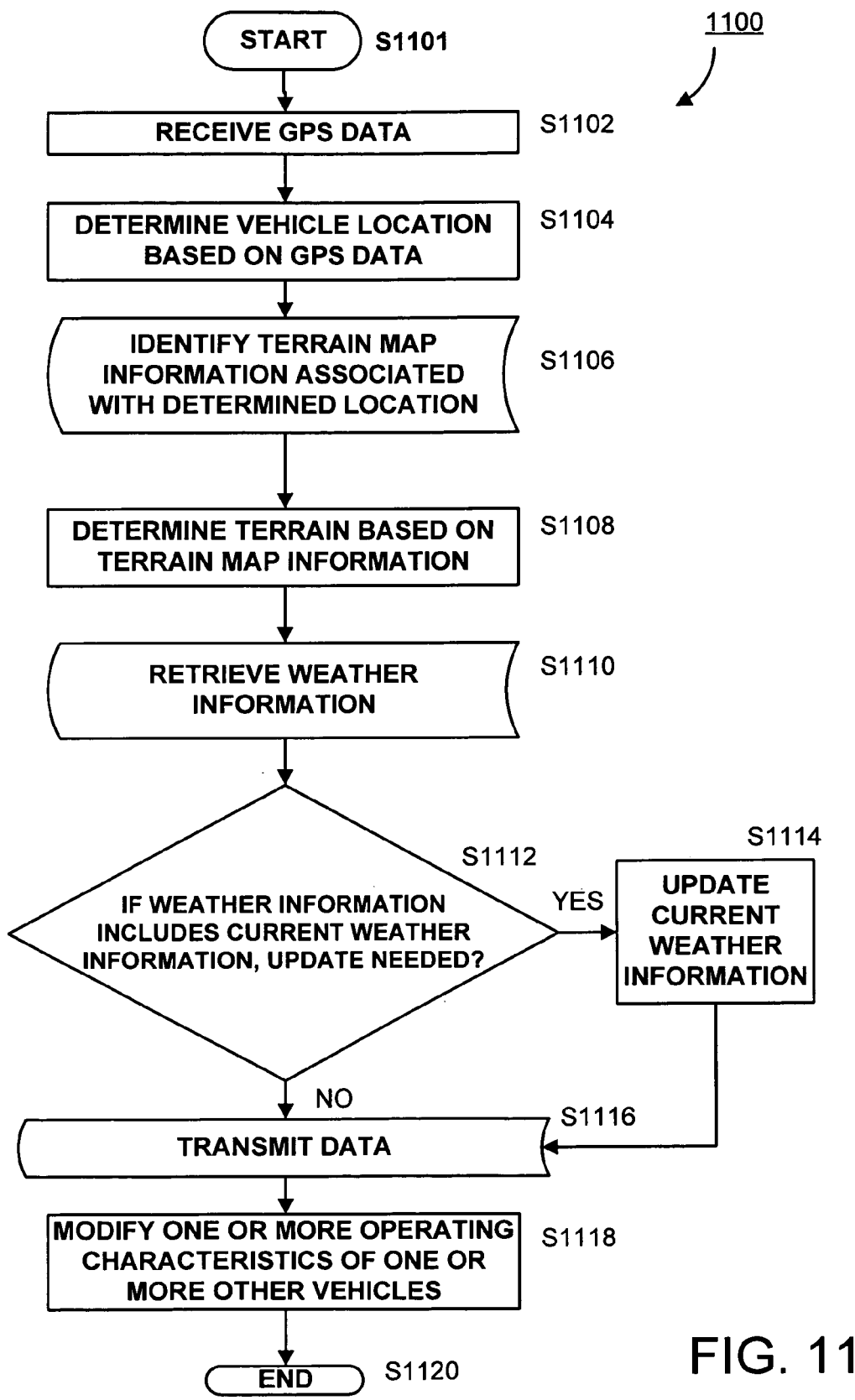
FIG. 11 is a flow chart of a method for transmitting data.

FIG. 11 is a flow chart of an embodiment of a method 1100 that can, according to various embodiments, transmit data. From FIG. 11, S1101 through S1108 are substantially the same as described in various embodiments presented above and will not be described again. From S1108, control proceeds to S1110, where weather information is retrieved. In various embodiments weather information can include current weather information, historical weather information, or both. The respective retrieval of current and historical weather information is substantially the same as described above for S410 and S510. Control may then proceed to S1112 where it is determined if weather information includes current weather information, and, if so, whether the current weather information needs to be updated. If either the weather information does not include current weather information or the current weather information does not need to be updated, control proceeds to S1116 where data is transmitted from vehicle 100. In various embodiments, data transmitted from vehicle 100 may be transmitted to a location or locations remote from vehicle 100, including terrestrial or extraterrestrial locations. In various embodiments, data transmitted from vehicle 100 may be transmitted to one or more other vehicles and/or systems. The one or more other vehicles and/or systems may be part of a network. Transmitted data can include the vehicle's location, a determined terrain, and weather information, including current and historical weather information. Current weather information may include substantially real time weather information. In various embodiments, the transmitted data is transmitted from vehicle 100 using weather information system 108 and/or GPS unit 106. However, transmitted data is not limited to being transmitted via weather information system 108 and/or GPS unit 106, and may be transmitted by any suitable means.

If, however, weather information includes current weather information and the current weather information needs to be updated, control may proceed from S1112 to S1114, whereupon current weather information is updated in substantially the same manner as described in S714 above. Control may then proceed to S1116, where data is transmitted as described above. After transmitting data, control can proceed to S1118 where one or more operating characteristics of respective one or more vehicles and/or systems are modified based on the transmitted data. In various embodiments, the modifying takes place automatically at the one or more vehicles and/or systems. Control may then proceed to S1120 where the method ends.

In one embodiment, vehicle operating characteristics may be automatically adjusted or adjusted in real time based on current weather information with or without use of terrain information. In another embodiment, vehicle operating characteristics may be adjusted, automatically, in real time, or otherwise on the basis of terrain information with or without weather information. For example, terrain information may indicate whether the vehicle is on a paved road, an unpaved road, off-road, or fording. In a further embodiment, terrain and/or weather information may be combined with a user's manual selection of vehicle operation modes to thereby adjust the vehicle's response to the user selection automatically or to the terrain and/or weather information.

Figure 12A:
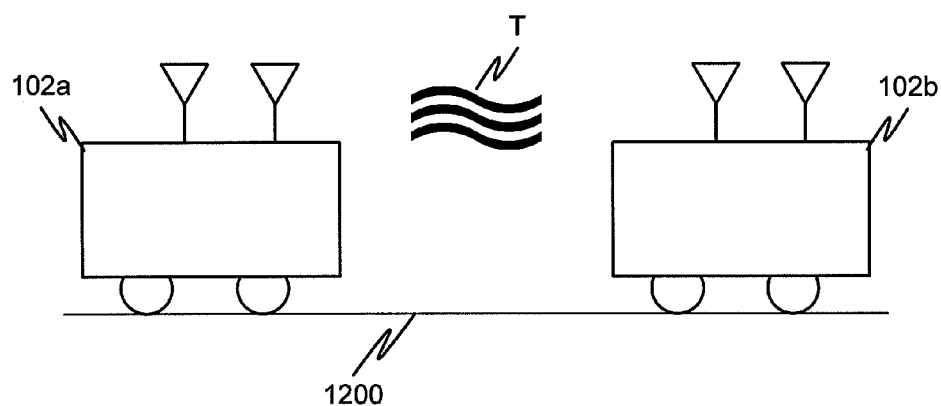
FIG. 12A is a basic pictorial representation of a first vehicle and a second vehicle, the first and second vehicles being in communication with one another.

FIG. 12A is a basic pictorial representation of a first vehicle 102a and a second vehicle 102b on surface 1200. Surface 1200 can be any suitable surface, such as unpaved ground, a paved road, an off-road surface, or an on-road surface. Vehicles 102a and 102b can be vehicles substantially as described herein, such as vehicle 102 shown in FIG. 1. Moreover, vehicles 102a and 102b can be the same or different. Vehicle 102a and 102b can be in communication with one another. In various embodiments, vehicle 102a can transmit data or information to vehicle 102b and vehicle 102b can receive the transmitted data or information. Likewise, vehicle 102b may be able to transmit data or information to vehicle 102a and vehicle 102a can receive the transmitted data or information. In various embodiments the transmitting and receiving can be done wirelessly, by any suitable means. See, for example, transmission waves T in FIG. 12A. In various embodiments, the transmitted data or information can include data or information based on a terrain associated with a position of vehicle 102a and/or weather information associated with the location of the vehicle 102a. The position of vehicle 102a can be an off-road or on-road position, for example. In various embodiments, the position of vehicle 102a can be at an unpaved position, such as unpaved ground. As noted above, one or more operating characteristic of vehicle 102b can be modified or adjusted based on the received data or information transmitted from vehicle 102a. In various embodiments, the adjusting or modifying can happen automatically and/or in real time in response to the received data or information. The data or information communicated between the vehicles can be substantially as described herein.

Figure 12B:
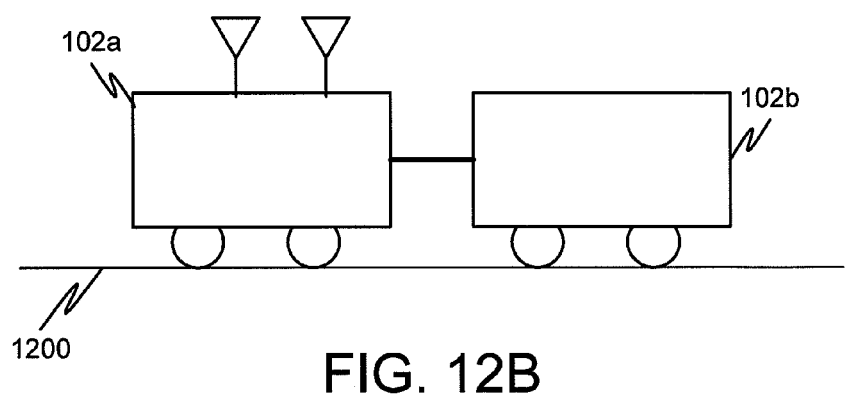
FIG. 12B is a basic pictorial representation of a first vehicle towing a second vehicle.

FIG. 12B is a basic pictorial representation of a vehicle 102a towing vehicle 102b on a surface 1200. Surface 1200 can be any suitable surface, such as unpaved ground, a paved road, an off-road surface, or an on-road surface. Vehicles 102a and 102b can be vehicles substantially as described herein. Vehicles 102a and 102b can be the same or different. In various embodiments vehicle 102a can tow vehicle 102b. Furthermore, vehicle 102a and vehicle 102b can be in communication with one another such that data or information can be passed between the vehicles. The communications between the vehicles can be wireless, for example (not explicitly shown). The data or information communicated between the vehicles can be substantially as described herein.

Thus has been disclosed a system and method for controlling operating and/or performance characteristics of a vehicle. In particular, various embodiments can comprise a system and method for controlling vehicle operating and/or performance characteristics based on at least one of a terrain determined based on global positioning system (GPS) data, current weather information, and historical weather information.

While the present invention has been described in conjunction with a number of embodiments, the invention is not to be limited to the description of the embodiments contained herein, but rather is defined by the claims appended hereto and their equivalents. It is further evident that many alternatives, modifications and variations would be or are apparent to those of ordinary skill in the applicable arts. Accordingly, all such alternatives, modifications, equivalents, and variations that are within the spirit and scope of this invention.

What is claimed is:

1. A method comprising:
   receiving, at a first computer in a first vehicle driving off-road, global positioning system (GPS) data;
   the first computer automatically determining a location of the first vehicle driving off-road based on said received GPS data, said determined location having an unpaved and off-road ground surface;
   the first computer automatically identifying terrain map information associated with said determined unpaved and off-road location of the first vehicle;
   based on the identified terrain map information, the first computer automatically determining a surface traction characteristic of the unpaved and off-road ground surface at the determined location;
   the first computer automatically retrieving weather information associated with the determined unpaved and off-road location; and
   the first computer automatically transmitting said surface traction characteristic information and said weather information from the first vehicle driving off-road to a second vehicle driving off-road;
   a second computer receiving said transmitted data at the second vehicle driving off-road;
   selecting, by an operator of the second vehicle driving off-road, an operation mode of the second vehicle;
   at the second computer in the second vehicle driving off-road, combining the surface traction characteristic information received from the first vehicle, the weather information received from the first vehicle, and the operation mode selected by the operator of the second vehicle driving off-road; and
   responsive to said combining, the second computer automatically modifying at least one operating characteristic of the second vehicle driving off-road.

2. The method according to claim 1, wherein said modifying takes place automatically at the second vehicle, the second vehicle being driven separately from the first vehicle.

3. The method according to claim 1, wherein the received data include the determined terrain and the weather information.

4. The method according to claim 1, wherein said retrieved weather information includes current weather information, and said method further comprises:
   determining if said current weather information is to be updated; and
   updating said current weather information if it is determined that said current weather information is to be updated.

5. The method according to claim 4, wherein said updating further includes:
   storing previously updated current weather information as historical weather information;
   receiving one or more weather inputs;
   determining updated weather information based on said one or more weather inputs;
   setting, as said current weather information, said determined updated weather information; and
   storing said current weather information.

6. The method according to claim 1, wherein said at least one modified operating characteristic of the second vehicle comprises an operating characteristic of a braking system.

7. The method according to claim 1, wherein said at least one modified operating characteristic of the second vehicle further comprises an operating characteristic of a traction control system.

8. The method of claim 1, further comprising, in response to the determined surface traction characteristic and the retrieved weather information associated with the determined unpaved and off-road location, formulating at the first vehicle a first command effective to modify operating characteristics of the first vehicle and a second command effective to modify operating characteristics of the second vehicle, the transmitted data consisting of said second command, the second vehicle being driven separately from the first vehicle.

9. The method of claim 1, wherein the received data comprises a command from the first vehicle effective to modify the at least one operating characteristic of the second vehicle, the command being based on the determined surface traction characteristic and the retrieved weather information associated with the determined unpaved and off-road location, the second vehicle being driven separately from the first vehicle.

10. The method of claim 1, further comprising, prior to retrieving the weather information, transmitting weather information to the first vehicle, the weather information being transmitted to the first vehicle by an extraterrestrial source.

11. A system comprising:
    means for receiving global positioning system (GPS) data;
    means for storing terrain map information;
    means for determining an unpaved and off-road location of a first land vehicle based on received GPS data, said location having an unpaved and off-road ground surface;
    means for identifying terrain map information associated with the determined unpaved and off-road location;
    means for determining a surface traction characteristic based on the identified terrain map information;
    means for retrieving weather information, said weather information including at least one of current weather information and historical weather information; and
    means for transmitting data representing said determined surface traction characteristic and said weather information from the first land vehicle to a second land vehicle.

12. The system according to claim 11, further comprising at said second land vehicle:
    means for receiving the data transmitted from the first land vehicle; and
    means for modifying at least one operating characteristic of the second land vehicle in real time in response to the received data.

13. A computer readable medium encoded with programmed instructions which, when executed by a processor, cause the processor to perform at least the following operations:
    receiving, at a first vehicle, global positioning system (GPS) data;
    determining a location of said first vehicle based on said received GPS data, said location having an unpaved and off-road ground surface;
    identifying terrain map information associated with said determined unpaved and off-road location;
    determining a surface traction characteristic based on the identified terrain map information, the terrain including surface traction characteristics at said determined unpaved and off-road location; and wirelessly transmitting said determined surface traction characteristics and weather information associated with the determined unpaved and off-road location from said first vehicle to a second vehicle.

14. The computer readable medium according to claim 13, wherein said programmed instructions which, when executed by a processor, cause the processor to retrieve weather information associated with the determined location, and to transmit said retrieved weather information to the second vehicle, the second vehicle driving independently of the first vehicle.

15. The computer readable medium according to claim 14, wherein retrieving weather information includes sensing current weather conditions with sensors on said first vehicle.

16. A system for adjusting vehicular operating characteristics, the system comprising:
   a first vehicle comprising:
   means for obtaining data representing a condition of ground over which the first vehicle passes, the ground being off-road and unpaved, the ground condition comprising a traction condition of the unpaved and off-road ground;
   means for transmitting said obtained data to a second vehicle, said data including data from a ground traction sensor onboard the first vehicle;
   a second vehicle comprising:
   means for receiving from the first vehicle the transmitted data representing the condition of the unpaved ground over which the first vehicle passed; and
   means for adjusting operating characteristics of the second vehicle automatically in response to the received data,
   wherein said means for obtaining data includes the ground traction sensor onboard the first vehicle.

17. The system of claim 16, wherein the obtained data indicates a level of slipperiness of the unpaved ground under the first vehicle.

18. The system of claim 16, wherein the second vehicle is towed by the first vehicle.

19. The system of claim 18, wherein the transmitted data are transmitted wirelessly from the first vehicle to the second vehicle.

20. The system of claim 16, wherein the transmitted data are transmitted wirelessly.

* * * * *